Aug. 14, 1956 K. E. RICHTER ET AL 2,759,083
APPARATUS FOR APPLYING HARD-FACING METALS
Filed April 2, 1954
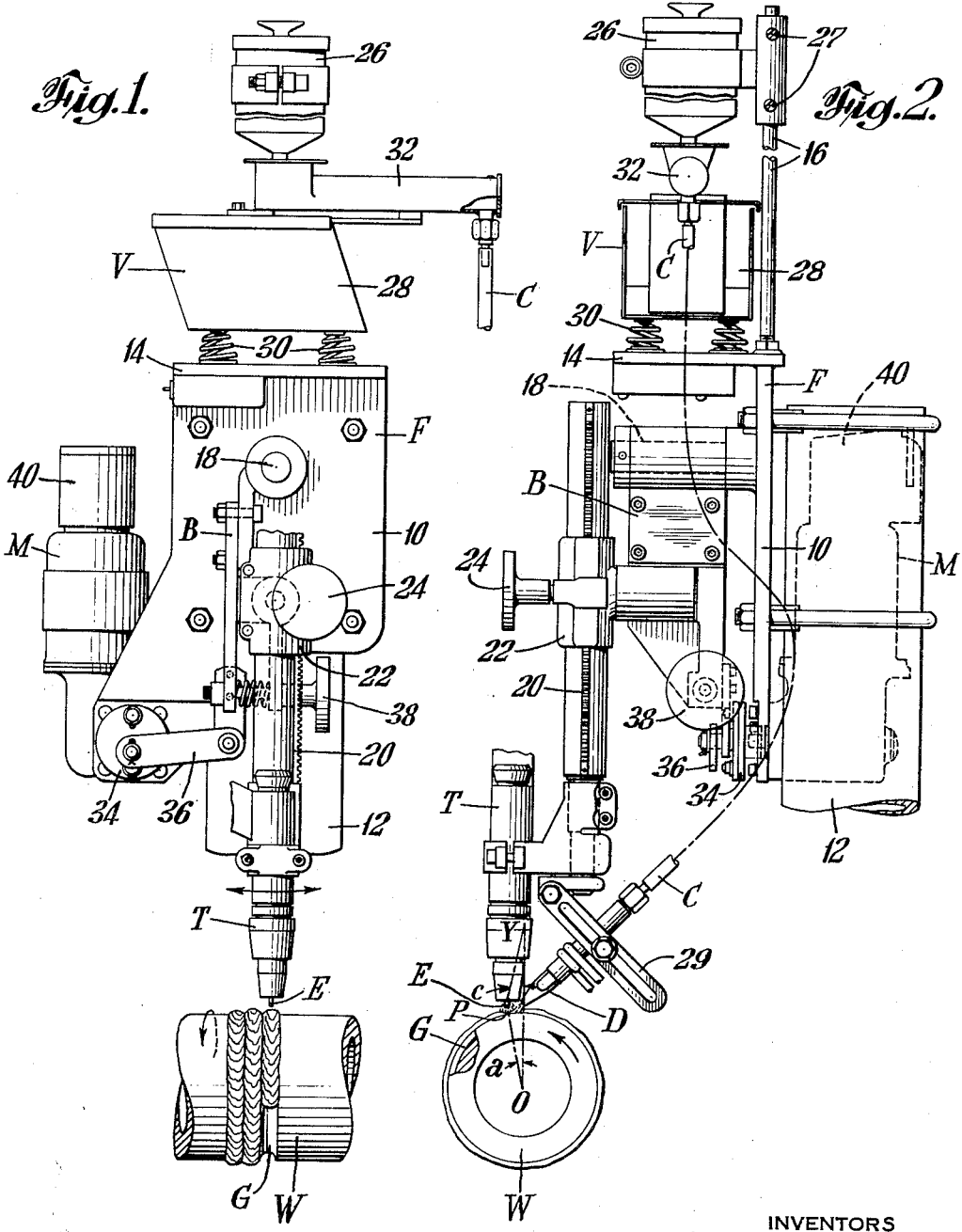
INVENTORS
KENNETH E. RICHTER
LLOYD W. YOUNG
BY Richard S. Shreve Jr.
ATTORNEY United States Patent Office 2,759,083
Patented Aug. 14, 1956

2,759,083

APPARATUS FOR APPLYING HARD-FACING METALS

Kenneth E. Richter, Morristown, and Lloyd W. Young, Elizabeth, N. J., assignors to Union Carbide and Carbon Corporation, a corporation of New York Application April 2, 1954, Serial No. 420,482

11 Claims. (Cl. 219—8)

This invention relates to apparatus for applying hard-facing metals, and more particularly for use on joints for drilling tools and the like, employing the abrasion resistant properties of hard metal carbide particles to provide a wear-resistant surface.

It is desirable to apply the hard-facing metal to the base metal in the form of a band, the carbide particles being supplied to the fused base metal. The distribution of these particles has been non-uniform, with the result that an excessive part of the carbide particles has been dissolved or settled to the bottom of the weld puddle, so that the abrasion resistant properties of the particles have been lost.

In order to avoid excessive increase in diameter, premachined grooves have been provided to receive the hard-facing material. The depth of penetration of fusion into the base metal, the height of build-up of the hard-facing metal, the even distribution of the particles, and the tendency to undercut have been difficult to control, and it has been necessary to employ expensive voltage control equipment for this method. Only narrow bands could be produced by single pass operation.

The objects of the present invention are to avoid the difficulties referred to above, to provide apparatus for supporting an inert gas shielded arc welding torch in position to strike an arc and form a weld puddle on the workpiece, and for supporting a carbide discharge nozzle to project hard metal carbide into the gas shielded weld puddle, to provide means for oscillating the carbide discharge nozzle in a plane transverse to the path of the weld puddle to provide uniform distribution of the carbide particles throughout the area of the band, to provide means for controlling the amplitude and frequency of oscillation, to control the depth of penetration of fusion into the base metal, to control the height of build-up of the hard-facing metal, to minimize undercutting and avoid the necessity of voltage control equipment, and to provide a vibratory dispenser for supplying hard metal carbide particles to the discharge nozzle.

According to the present invention the apparatus comprises a frame, an inert gas shielded arc welding torch carried by said frame and preferably mounted for vertical racking adjustment, a bracket pivoted on said frame for swinging in a plane transverse to the path of the welding puddle formed by the torch, a carbide discharge nozzle carried by said bracket for directing hard metal carbide into the welding puddle, and power-actuated means for oscillating the bracket. Preferably the power-actuated means is adjustable to control the amplitude and frequency of the oscillation, such as an eddy current type governor on a motor, and an adjustable eccentric cam driven by the motor. Means are preferably provided on the frame for supplying the carbide, for example a vibratory dispenser, and a conduit preferably plastic tubing conducts the carbide to its nozzle.

In operation, an arc is struck between the metal workpiece connected to a source of welding current and an electrode connected to said source to form thereon a weld puddle, the arc and weld puddle are shielded with a stream containing inert gas, a stream of hard-facing material particles is projected through the shielding gas into the weld puddle. The arc, weld puddle, shielding gas and stream of hard-facing particles are progressed simultaneously along a line of weld on said metal workpiece. Preferably the ratio of welding current density to rate of feed of metal carbide particles is controlled to avoid excessive fusion of said particles. The electrode is preferably maintained at an angle of from zero to 15 degrees to the normal to the surface of the workpiece. With a rotary workpiece, the tip of the electrode is preferably angularly displaced ahead of the vertical radius for an angle of from zero to 20 degrees. The stream of refractory carbide particles is preferably at an angle of 40 degrees to 80 degrees to the surface of the workpiece. The stream of metal carbide particles is preferably oscillated transversely with respect to the line of weld, to distribute said particles uniformly into the weld puddle and to increase the width of the band deposited, the frequency of oscillation being preferably from 40 to 120 cycles per minute. The base metal is sometimes preheated to a temperature of about 600° F. to avoid cracking of the more hardenable base metals.

In the drawings:

Fig. 1 is a front elevation of apparatus according to the preferred embodiment of the present invention; and Fig. 2 is a side elevation of the same.

The apparatus shown in the drawings comprises a frame F supported in a convenient location with respect to the workpiece W which has been premachined to provide grooves G to receive the hard facing material, and may be mounted in a turning fixture or the like for rotation in the direction of the arrow shown. Mounted on the frame F is an inert gas shielded arc welding torch T, for striking an arc between an electrode E and the base metal at the bottom of the groove G in the workpiece W and forming thereon a weld puddle P. A vibratory dispensing mechanism V is provided for supplying the granular carbide through an flexible conduit C to a discharge nozzle D which projects a stream of carbide particles through the gas blanket into the weld puddle. The torch T and discharge nozzle D are mounted on a bracket B pivoted on the frame F, and oscillated by a motor M.

In the form shown, the frame F comprises a plate 10 bolted to a pipe stanchion 12, and provided with a horizontal shelf 14, an upright standard 16, and a horizontal axle 18 below the shelf. The bracket B is pivoted on the axle 18 and depends therefrom for swinging movement in a plane parallel to the axle 18. The torch T is mounted on a rack 20 slidable in a sleeve 22 and engaged by a gear therein operated by a knob 24. The carbide discharge nozzle D is also mounted on the rack 20, by linkage 29 for adjusting the position of the nozzle D with respect to the torch T, preferably at an angle of from 40° to 80° to the surface of the workpiece.

The dispensing mechanism V comprises a hopper 26 vertically adjustably secured to the standard 16 by set screws 27, and an electromagnetic vibratory dispenser 28 mounted on the shelf 14 by means of springs 30. The dispenser 28 has an open top receiving carbide granules from the hopper 26, and a trough 32 leading to the conduit C, which is preferably a length of plastic tubing.

The motor M is mounted on the plate 10, and an adjustable eccentric 34 on the motor shaft is connected by a link 36 to the bracket B. The bracket B carries the pivotable torch holder 22, the connection being adjustable by a hand wheel 38. An eddy current governor 40 is mounted on the motor M for adjustment of the speed thereof to control the frequency of oscillation, preferably from 40 to 120 cycles per minute. The amplitude of the oscillation is controlled by adjustment of the eccentric 34.

As shown in Fig. 2, the line O—Y is a vertical centerline passing through the center O of the circular workpiece. The angle c is formed between said vertical centerline O—Y and the axis of the electrode. The optimum range of the angle c is from zero to fifteen degrees.

The designation a indicates an angle measurement to locate the tip of the electrode forward of the centerline O—Y. The magnitude of the angle varies with the diameter and speed of the workpiece W. For a workpiece of six inch diameter the angle varies from zero degrees to twenty degrees, being a function of the rotational speed of the workpiece.

The band contour can be importantly controlled by the favorable positioning of the workpiece, this control being obtained by the desirable combination of angles a and c.

The electrode E is preferably non-consumable, for example tungsten, preferably thoriated, and preferably pointed, which melts to a geometry which allows maximum current density at the point of discharge to thereby eliminate wandering of the arc, and reduces undercutting of the weld edges.

The current may be alternating current with superimposed high frequency, or direct-current straight polarity. For a given amplitude of oscillation, the hard-faced band produced using ACHF is wider than that produced using DCSP. The tendency to undercut using DCSP is eliminated using ACHF. The band build-up and depth of penetration is reduced using ACHF over that using DCSP. Tungsten electrode consumption is greater using ACHF. Best overall results show preference for DCSP with a pointed thoriated tungsten electrode.

Hard-facing bands were satisfactorily produced employing a machined groove ½ inch wide and 1/32 inch deep. Welding speeds of 9 through 11 inches per minute were obtained using 300 to 475 amperes, a 15 volt arc and a 600° F. preheat. With production experience faster speeds are likely. With helium the voltage would be somewhat higher. The bands produced were from ⅝ to ¾ inch wide. The particles sizes were 20/30, 30/40, 40/60 and 40/100, dispensing from 45 to 90 grams per minute. Using ACHF, bands approximately one inch wide were made.

The tendency to cracking in the band matrix may be reduced by feeding low-carbon steel or iron into the weld puddle. This may be done by feeding the ferrous metal particles separately or premixed with the crushed tungsten carbide particles, or by feeding a ferrous metal wire into the leading edge of the puddle.

We claim:

1. Apparatus for hand facing a metal workpiece to form thereon a wear-resistant surface, which comprises means for striking an arc on the metal workpiece to form thereon a weld puddle, means for shielding the arc and weld puddle with a stream of gas, means for projecting a stream of hard-facing particles through the shielding gas into said weld puddle, means for progressing the arc, weld puddle, shielding gas and stream of hard-facing particles simultaneously along a line of weld on said metal workpiece, and means for simultaneously oscillating said stream of hard-facing particles transversely with respect to said line of weld to distribute said particles uniformly throughout the weld puddle.

2. Apparatus for hand facing a metal workpiece to form thereon a wear-resistant surface, which comprises means for striking an arc on the workpiece to form a weld puddle, means for shielding the arc and weld puddle with a stream of gas, means for projecting a stream of hard-facing particles through the shielding gas into said weld puddle at an angle of 40° to 80° to the surface of the workpiece, means for progressing the arc, weld puddle, shielding gas and stream of hard-facing particles simultaneously along a line of weld on said metal workpiece, and means for simultaneously oscillating said stream of hard-facing particles transversely with respect to said line of weld to distribute said particles uniformly throughout the weld puddle.

3. Apparatus for hard facing a metal workpiece to form thereon a wear-resistant surface, which comprises means for striking an arc on the metal workpiece to form thereon a weld puddle, means for shielding the arc and weld puddle with a stream of gas, means for projecting a stream of hard-facing particles through the shielding gas into the weld puddle, means for progressing the arc, weld puddle, shielding gas and stream of hard-facing particles simultaneously along a line of weld on said metal workpiece, and means for simultaneously oscillating said electrode and stream of hard-facing particles transversely with respect to said line of weld to distribute said particles uniformly over the weld puddle.

4. Apparatus for hard facing a metal workpiece to form thereon a wear-resistant surface, which comprises a frame, a vibratory dispenser spring mounted on said frame, a gas shielded arc welding torch carried by said frame for striking an arc on the metal workpiece to form thereon a weld puddle, for shielding the arc and weld puddle with a stream containing inert gas, a flexible conduit leading from said dispenser for projecting a stream of hard-facing particles through the shielding gas into the weld puddle, means for progressing the arc, weld puddle, shielding gas and stream of hard-facing particles simultaneously along a line of weld on said metal workpiece, and means for simultaneously oscillating said electrode and stream of hard-facing particles transversely with respect to said line of weld with a frequency of forty to one hundred and twenty cycles per minute.

5. Apparatus for hard facing a metal workpiece having a surface of revolution to form thereon a wear-resistant surface, which comprises a frame, a vibratory dispenser spring mounted on said frame, a gas shielded arc welding torch carried by said frame for striking an arc between said workpiece connected to a source of welding current and an electrode connected to said source to form a weld puddle, means for maintaining the axis of said electrode at an angle of from zero to fifteen degrees to a radius of said surface of revolution, said torch shielding the arc and weld puddle with a stream containing inert gas, a flexible conduit leading from said dispenser for projecting a stream of hard-facing particles through the shielding gas into said weld puddle, means for rotating the workpiece with respect to the arc, welding puddle, shielding gas stream, and stream of hard-facing particles, and means for simultaneously oscillating said stream of hard-facing particles in a path substantially parallel to the axis of rotation of said workpiece to distribute said particles uniformly throughout the weld puddle.

6. Apparatus for hard facing a metal workpiece, comprising a frame relatively movable with respect to said workpiece along a path, an inert gas shielded arc welding torch carried by said frame for striking an arc on said workpiece and forming thereon a shielded weld puddle moving along said path, a bracket pivoted on said frame for swinging in a plane transverse to said path, a carbide discharge nozzle carried by said bracket for directing hard metal carbide into said shielded weld puddle, and power-actuated means for oscillating said bracket and the carbide discharge nozzle carried thereby about its pivot on said frame in said plane transverse to said path.

7. Apparatus for hard facing a metal workpiece comprising a frame relatively movable with respect to said workpiece along a path, an inert gas shielded arc welding torch carried by said frame for striking an arc on said workpiece and forming thereon a shielded weld puddle moving along said path, racking means for vertical adjustment of said torch with respect to said workpiece, a bracket pivoted on said frame for swinging in a plane transverse to said path, a carbide discharge nozzle carried by said bracket for directing hard metal carbide into said shielded weld puddle, and power-actuated means for oscillating said bracket and the carbide discharge nozzle carried thereby about its pivot on said frame in said plane transverse to said path.

8. Apparatus for hard facing a metal workpiece comprising a frame, means of said frame for supplying granular hard metal carbide, an inert gas shielded arc welding torch carried by said frame for striking an arc on a metal workpiece and forming a shielded weld puddle, a bracket pivoted on said frame, a carbide discharge nozzle carried by said bracket for directing the granular carbide from said supply into said shielded weld puddle, and a motor driven linkage for oscillating said bracket and the carbide discharge nozzle carried thereby about its pivot on said frame.

9. Apparatus for hard facing a metal workpiece comprising a frame, a hopper mounted on said frame for supplying granular hard metal carbide, a refractory dispenser independently mounted on said frame below said hopper for receiving granulated carbide therefrom, an inert gas shielded arc welding torch carried by said frame for striking an arc on a metal workpiece and forming a shielded weld puddle, a bracket pivoted on said frame, a carbide discharge nozzle carried by said bracket for directing the granular carbide into said shielded weld puddle, a flexible conduit conducting granular carbide from said vibratory dispenser to said carbide discharge nozzle, and a motor driven linkage for oscillating said bracket and the carbide discharge nozzle carried thereby about its pivot on said frame.

10. Apparatus for hard facing a metal workpiece comprising a frame relatively movable with respect to said workpiece along a path, an inert gas shielded arc welding torch carried by said frame for striking an arc on said metal workpiece and forming thereon a shielded weld puddle moving along said path, a bracket pivoted on said frame for swinging in a plane transverse to said path, a carbide discharge nozzle carried by said bracket for directing hard metal carbide into said shielded weld puddle, linkage for oscillating said bracket and the carbide discharge nozzle carried thereby about its pivot on said frame, and a motor for driving said linkage having an eddy current type governor for controlling the frequency of oscillation of said bracket and nozzle.

11. Apparatus for hard facing a metal workpiece, comprising a frame relatively movable with respect to said workpiece along a path, an inert gas shielded arc welding torch carried by said frame for striking an arc on said workpiece and forming thereon a shielded weld puddle moving along said path, a bracket pivoted on said frame for swinging in a plane transverse to said path, a carbide discharge nozzle carried by said bracket for directing hard metal carbide into said shielded weld puddle, and means for oscillating said bracket and the carbide discharge nozzle carried thereby about its pivot on said frame and in a plane transverse to said weld puddle path comprising a motor and an eccentric cam driven thereby, the eccentric cam being adjustable to control the amplitude of such oscillation.

References Cited in the file of this patent

UNITED STATES PATENTS

| | | |
|---|---|---|
| 1,933,340 | Raymond | Oct. 31, 1933 |
| 2,427,350 | Carpenter et al. | Sept. 16, 1947 |
| 2,591,809 | Hanson | Apr. 8, 1952 |
| 2,592,414 | Gibson | Apr. 8, 1952 |
| 2,709,213 | Gibson | May 23, 1955 |